J. J. WESLEY.
SUPPLEMENTAL BOTTOM FOR COOKING UTENSILS.
APPLICATION FILED NOV. 18, 1915.
1,222,056. Patented Apr. 10, 1917.
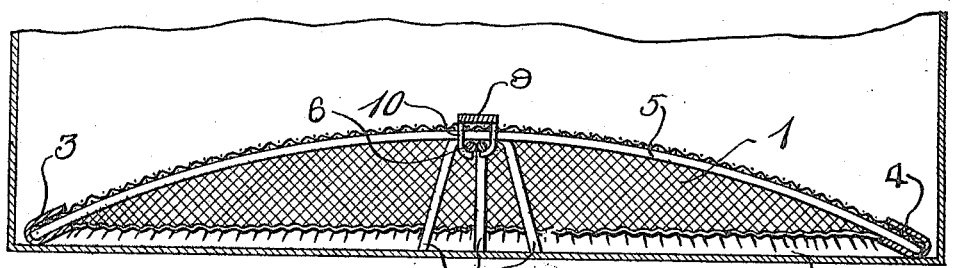
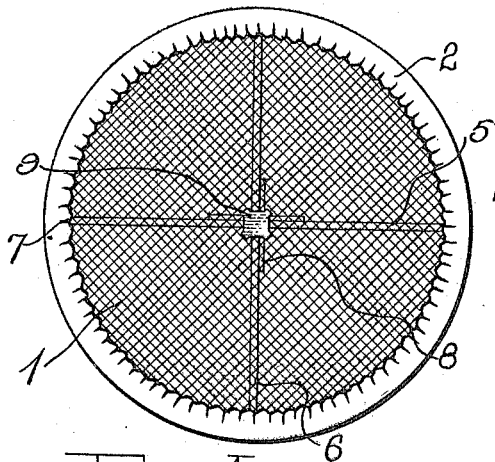
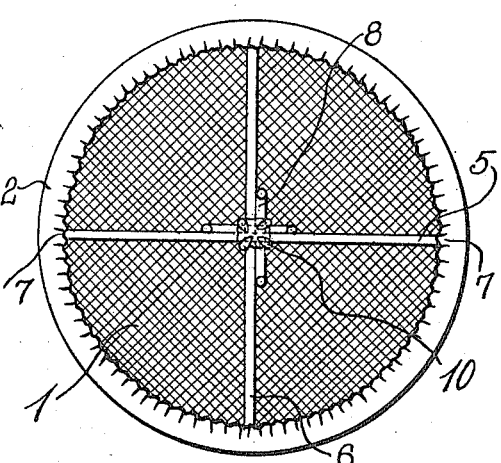
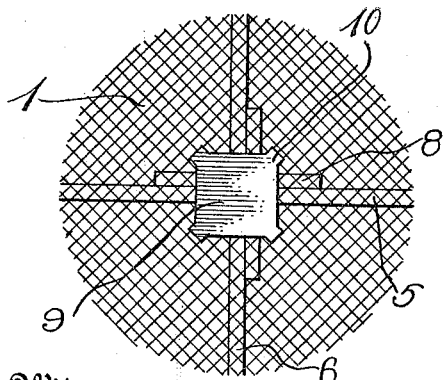
Witnesses
George W. Giovannetti
Inventor
J. J. WESLEY.
By H. R. Willson & Co.
Attorneys

UNITED STATES PATENT OFFICE.

JAMES J. WESLEY, OF PHOENIX, ARIZONA.

SUPPLEMENTAL BOTTOM FOR COOKING UTENSILS.

1,222,056.                Specification of Letters Patent.     Patented Apr. 10, 1917.

Application filed November 18, 1915. Serial No. 62,172.

*To all whom it may concern:*

Be it known that I, JAMES J. WESLEY, a citizen of the United States, residing at Phoenix, in the county of Maricopa and State of Arizona, have invented certain new and useful Improvements in Supplemental Bottoms for Cooking Utensils; and I do declare the following to be a full, clear, and exact description of the invention such as will enable others skilled in the art to which it appertains to make and use the same.

This invention relates to cooking utensils and more particularly to racks or supplemental bottoms for pots or pans.

The object of the invention is to provide a simply constructed, cheap and efficient device of this character which will reliably support meats, vegetables or the like, and prevent them from coming in contact with the kettle bottom and hence avoid scorching thereof.

Furthermore, this device is designed to operate as a time saver, in that when employed the food when once placed thereon requires no further attention until ready to serve.

With these and other objects in view, the invention consists of certain novel features of construction, and the combination and arrangement of parts hereinafter described and claimed.

In the accompanying drawings:

Figure 1 represents a vertical section through a kettle in which this improved bottom is mounted, said bottom being shown also in section;

Fig. 2 is a top plan view of the rack or supplemental bottom detached;

Fig. 3 is a bottom plan view thereof;

Fig. 4 is an enlarged detail plan view of the center of the rack;

Fig. 5 is a similar view taken from the lower side or bottom.

In the embodiment illustrated the rack or supplemental bottom constituting this invention comprises a circular convex member 1 of perforated material, being here shown composed of screen wire, although not necessarily so. This member 1 as shown is in the form of a disk and has the edge thereof bound with a sheet metal band 2, folded longitudinally to dispose the members 3 and 4, thereof, on opposite faces of the plate and which is here shown crimped to said plate, whereby it is reliably retained in operative position.

Bracing members for the disk 1 are here shown in the form of two metal rods 5 and 6 which intersect each other midway their ends with their point of intersection shown arranged at the center of the lower face of the disk 1. These rods may be connected at their points of intersection by any suitable means, being here shown soldered, and the arms thereof radiate from said plate center. These rods are of a length corresponding to the diameter of the plate and the ends of the rods are disposed between the members 3 and 4 of the reinforcing band and are secured to the lower face of the plate by this connection, said ends being here shown disposed in one of the grooves 7 formed by crimping said band.

Depending from the center of the lower face of the plate 1 are a plurality of supporting legs 8 which are here shown secured to the rods 5 and 6 at their points of intersection, said legs being made in the form of inverted U-shaped members, the arms of which flare outwardly. These members are shown with their cross bars intersecting each other so as to dispose the legs formed by the arms an equal distance apart, although this need not be necessarily so and any other desired number may be employed. These legs are of a suitable length to space the central portion of the plate 1 from the bottom of the kettle or pan, to which the device is applied, with their terminals arranged in alinement with the reinforced perimeter of the disk, said legs coöperating with said perimeter to support the disk and the material placed thereon. The cross bars of these leg members are arranged parallel and in contact with the brace bars forming a reinforce for said bars at the center of the disk.

As shown, a clip 9 connects the rods 5 and 6 and the legs 8 to the center of the plate 1 at their points of intersection and is here shown in the form of a small rectangular plate having fingers or prongs 10 extending at right angles from one face thereof at suitably spaced intervals, and which are designed to pass through the perforations in the plate 1 and to be bent downwardly over and engage the rods 5 and 6, one finger being passed through the disk 1 at the angle formed of two of the adjusting rods or bracing members.

As shown, the free ends of the rods 5 and 6 are flattened to facilitate their connection with the disk.

In the use of this improved rack or supplemental bottom, when it is desired to boil or roast meat or other food products, the disk 1 is placed in the kettle to be used with the legs 8 thereof resting on the bottom of the kettle, and with the reinforced edge thereof approaching the face of said kettle bottom to provide for the free circulation of water under said disk. The reinforced edges of the disk may rest on the kettle bottom, the concavo-convex shape of the disk providing for this, the central portion thereof being disposed a greater distance from the kettle bottom than its edge. After the rack has been placed in the kettle, the meat or other article to be cooked is placed thereon, water may be poured into the kettle, to any desired extent according to the manner in which the food is to be cooked and no further attention is necessary, for even should the water boil out this rack will hold the food spaced from the kettle bottom a sufficient distance to prevent burning of the food.

I claim as my invention:—

A supplemental bottom for pots and pans comprising a circular convex screen wire member, a metal reinforcing band crimped around the edge of said member on both faces thereof, arcuate bracing bars extending transversely across the lower face of said member in contact therewith and extending in planes at right angles to each other, said bars intersecting each other at the center of the circular member and having their ends housed between the members of said band, inverted U-shaped legs arranged at the intersection of said cross bars, the cross bars of the legs intersecting each other and arranged at right angles, the cross bar of each leg being arranged parallel and in contact with one of the brace bars forming a reinforce therefor, said legs having their ends diverging and the terminals thereof arranged in alinement with the reinforced edge of the wire screen member, and a clip comprising a rectangular plate disposed on the outer face of the screen wire member and provided at the corners thereof with prongs which extend through the screen wire member at the angles of the intersecting brace bars and legs and are bent around said bars and legs for rigidly connecting them together and to the screen wire member.

In testimony whereof I have hereunto set my hand in presence of two subscribing witnesses.

JAMES J. WESLEY.

Witnesses:
A. N. CALLISON,
C. M. WHITE.

Copies of this patent may be obtained for five cents each, by addressing the "Commissioner of Patents, Washington, D. C."